United States Patent
Franco

(10) Patent No.: US 12,478,201 B2
(45) Date of Patent: Nov. 25, 2025

(54) METHOD OF PRODUCING A DEVICE FOR PROTECTING A BEVERAGE STRAW

(71) Applicant: Veronica Franco, Corpus Christi, TX (US)

(72) Inventor: Veronica Franco, Corpus Christi, TX (US)

(*) Notice: Subject to any disclaimer, the term of this patent is extended or adjusted under 35 U.S.C. 154(b) by 144 days.

(21) Appl. No.: 18/628,617

(22) Filed: Apr. 5, 2024

(65) Prior Publication Data

US 2024/0336025 A1    Oct. 10, 2024

Related U.S. Application Data

(60) Provisional application No. 63/494,419, filed on Apr. 5, 2023.

(51) Int. Cl.
| | | |
|---|---|---|
| A47G 21/18 | (2006.01) | |
| B29C 39/00 | (2006.01) | |
| B29C 39/10 | (2006.01) | |
| B29D 99/00 | (2010.01) | |
| B29L 23/00 | (2006.01) | |
| B29L 31/00 | (2006.01) | |
| B29K 63/00 | (2006.01) | |
| B65D 77/28 | (2006.01) | |

(52) U.S. Cl.
CPC .......... *A47G 21/182* (2013.01); *B29C 39/003* (2013.01); *B29C 39/10* (2013.01); *B29D 99/0096* (2013.01); *B29C 2793/0018* (2013.01); *B29K 2063/00* (2013.01); *B29L 2023/008* (2013.01); *B29L 2031/712* (2013.01); *B65D 77/28* (2013.01)

(58) Field of Classification Search
CPC ..................................................... A47G 21/18
See application file for complete search history.

(56) References Cited

U.S. PATENT DOCUMENTS

| | | | |
|---|---|---|---|
| 6,283,294 B1* | 9/2001 | Thorball | A61M 5/1407 |
| | | | 424/439 |
| 6,565,899 B1* | 5/2003 | Cecere | B65D 77/28 |
| | | | 426/132 |
| 6,585,170 B2* | 7/2003 | Katsukawa | B29C 45/14598 |
| | | | D7/300.2 |
| 7,591,219 B2* | 9/2009 | Saha | A47J 31/20 |
| | | | 100/211 |
| 10,123,641 B1* | 11/2018 | Pepper | B08B 1/165 |
| 10,863,839 B1* | 12/2020 | Conrad, Jr. | A47G 21/184 |
| 11,102,341 B1* | 8/2021 | Kutsko | H04B 1/3888 |
| 11,266,257 B1* | 3/2022 | Reid | B65D 41/16 |
| 2012/0236679 A1* | 9/2012 | Oliveira | G09F 23/06 |
| | | | 366/129 |
| 2012/0328741 A1* | 12/2012 | Hannah | A23L 2/52 |
| | | | 426/85 |
| 2018/0199741 A1* | 7/2018 | Taylor | A47G 21/182 |

(Continued)

*Primary Examiner* — Benjamin A Schiffman

(74) *Attorney, Agent, or Firm* — Lockhart IP; Curtis W. Lockhart

(57) ABSTRACT

A method of producing a device for protecting a beverage straw is provided. The method includes the steps of providing an outer body mold for use with an epoxy resin to form an outer body of the device. An inner cavity is then bored into the outer body of the device to receive a beverage straw. Finally, a fastener is attached to the device to allow a user quick and convenient access to the device when on the go.

4 Claims, 1 Drawing Sheet

(56) References Cited

U.S. PATENT DOCUMENTS

| | | | |
|---|---|---|---|
| 2020/0253404 A1* | 8/2020 | Cohen | A47L 17/00 |
| 2020/0260891 A1* | 8/2020 | Sone | B65D 75/54 |
| 2021/0030179 A1* | 2/2021 | Hensley | A47G 21/182 |
| 2021/0122559 A1* | 4/2021 | O'Dell | A47G 21/184 |
| 2022/0007867 A1* | 1/2022 | Puppo | A47G 21/189 |

* cited by examiner

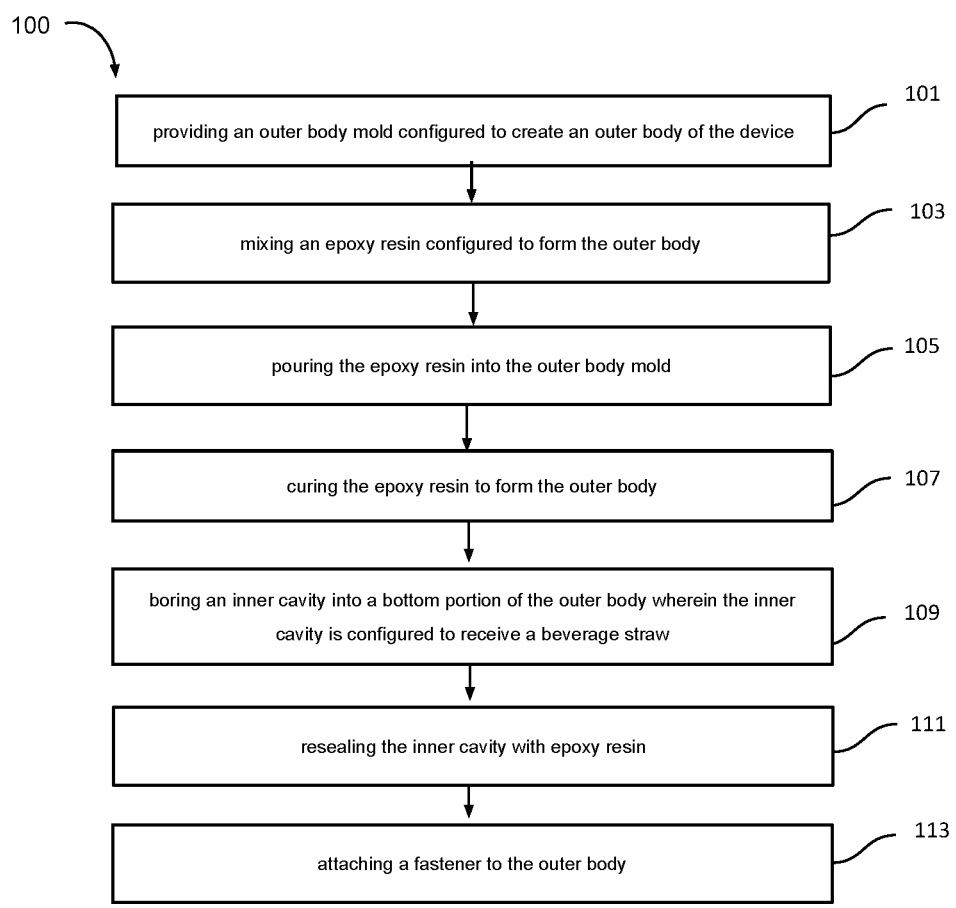

METHOD OF PRODUCING A DEVICE FOR PROTECTING A BEVERAGE STRAW

CROSS-REFERENCE TO RELATED APPLICATION

This application claims the benefit of U.S. Provisional Patent Application No. 63/494,419, filed Apr. 5, 2023, which is incorporated by reference herein in its entirety.

COPYRIGHT AND TRADE DRESS NOTICE

A portion of the disclosure of this patent document contains material that is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

1. Field of the Invention

The present invention relates generally to beverage devices, and more specifically, to a method of producing a device for protecting a beverage straw from exposure to external contaminants.

2. Description of Related Art

This background information is intended to further educate the reader as to additional aspects of the prior art and may present examples of specific aspects of the prior art that is not to be construed as limiting the disclosure of the present application.

Beverage consumption is a common daily activity. Many people use straws when drinking beverages, especially in social settings such as at a restaurant, bar, or cafe. However, conventional drink straws do not inherently provide any protection against external contamination, which can occur when bacteria and other harmful substances come into contact with the straw and subsequently enter the drinker's mouth which can cause health risks for the drinker. Contamination of a straw can happen from a variety of sources including contact with unclean surfaces or exposure to airborne particles.

For example, insects such as flies are known to land on drinking straws and leave waste behind, which is then ingested by the drinker. Additionally, other external contaminants such as bacteria and mold can accumulate on drinking straws if they are left exposed to the environment. The presence of these contaminants on conventional drink straws is not only inconvenient and unpleasant, but can also be dangerous for the health of the person using them.

The problem of contamination of beverage straws is particularly problematic in public settings, such as restaurants, bars, and cafes, where many people may be in close proximity and shared spaces. This can further increase the risk of exposure to harmful bacteria and viruses.

Traditional methods of addressing these problems include using paper towels or other similar materials to cover the straw. However, this method is ineffective because the paper towel will often fall off the straw thus exposing the straw to external contamination. Further, the use of paper towels contributes additional pollution to the environment.

Accordingly, there exists a need for a device for protecting a beverage straw from external contamination.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

The disclosure of the present application addresses the above stated deficiencies with conventional drinking straws. The method of producing a device for protecting a beverage straw provides a device that can be placed on top of a beverage straw to prevent bacteria and other harmful contaminants from contacting the straw and subsequently entering into the drinker's mouth.

The device is made from non-toxic and recyclable materials making it safe for use and for the environment. Additionally, the device includes a fastener which allows the user quick and convenient access to the device in any situation. The fastener may be a clamp or clip that allows the user to attach the device conveniently such as to a purse, belt loop, key ring, or the like.

When in use, the device allows the user a convenient means for protecting a straw when the user is not actively drinking. The user can easily remove the device to take a drink and then replace the device to protect the straw until the user takes another drink. The device may also be customizable to fit the user's personal preferences.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 illustrates a flow chart of a method of producing a device for protecting a beverage straw in accordance with a preferred embodiment of the present application.

While the method and device of the present application is subject to various modifications and alternative forms, specific embodiments have been shown by way of example in the drawings and are described in detail. It should be understood that the description of specific embodiments is not intended to limit the invention to the particular embodiment disclosed, but rather to cover all modifications, equivalents, and alternatives falling within the scope of the present application as defined by the appended claims.

DETAILED DESCRIPTION

Illustrative embodiments of the method and device of the present application are provided herein. It should be appreciated that in the development of any actual embodiment, various implementation-specific decisions are required to achieve the developer's specific goals, such as compliance with system-related and business-related constraints, which vary from one implementation to another. Moreover, it should be appreciated that such a development effort might be complex and time-consuming but would nevertheless be a routine undertaking for those of ordinary skill in the art having the benefit of this disclosure.

The method and device in accordance with the present application overcomes one or more of the above-discussed shortcomings commonly associated with conventional straws. Specifically, the method of producing a device for protecting a beverage straw allows the user of the device quick and convenient access to protect a drinking straw against external contamination that can be harmful to the user's health and safety. These and other unique features of the device are discussed below and illustrated in the accompanying drawings.

The method and device should be understood, both as to its structure and operation, from the accompanying drawings, taken along with the accompanying description. Various embodiments of the method and device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the various views, FIG. 1 depicts a flowchart of a method of producing a device for protecting a beverage straw 100 in accordance with a preferred embodiment of the present application. Method 100 includes the steps of providing an outer body mold used to create an outer body of the device in step 101, mixing an epoxy resin which forms the outer body in step 103, pouring the epoxy resin into the outer body mold in step 105, curing the epoxy resin to form the outer body in step 107, boring an inner cavity into a bottom portion of the outer body in step 109, resealing the inner cavity with epoxy resin in step 111, and attaching a fastener to the outer body in step 113.

In the initial step 101 of the method 100, the device for protecting a beverage straw is produced by first providing a custom mold for the outer body. The mold may be any convenient form and shape and may be based on one or more preferences indicated by a user to reflect the user's individual preferences and creative expression. The mold design can range from simple geometric shapes to more intricate and personalized forms, such as animal figures, symbols, initials, or the like.

Next, in steps 103 and 105 an epoxy is mixed and poured into the custom mold. Additions may be added to the mix such as various colors, glitter, accessories, keepsakes, or the like, to enhance the appearance and aesthetic features of the device and provide a means for creative expression for the user based on the one or more user preferences. This and other features allow for a high degree of personalization by the user.

After pouring the epoxy resin into the mold, the resin is allowed to cure until it solidifies, forming the rigid outer body of the straw protector device in step 107. The outer body has a form and shape that both allows the device to serve its intended function, and the user to express his or her individual personality. For example, the outer body may have the form and shape that resembles a taco, a heart, a star, the user's favorite fictional character, or the like. The curing time may vary depending on the type and composition of the epoxy resin used, as well as environmental conditions such as temperature and humidity. Once the epoxy mold is fully cured, the outer body is removed and further aesthetic features may be added accordingly such as engravings, paintings, or other insignias based on the one or more user preferences. These customizations can serve as aesthetic enhancements or can be functional, like labeling or branding.

Once the outer body has cured and formed, the inner cavity is drilled into a bottom portion of the outer body to accommodate a beverage straw in step 109. The inner cavity is formed from a round hollowed portion of the outer body having a diameter and circumference slightly larger than a conventional straw and configured to receive a conventional straw such that the end of the straw where the user's mouth touches to take a drink is completely covered. The inner cavity may take a different form and shape in accordance with an unconventional shape and size of a straw that the user desires to protect. The diameter of the inner cavity is carefully calibrated to ensure the device fits securely around the straw, preventing any unnecessary movement that could lead to wear and/or contamination.

Next, in step 111, epoxy resin is added to reseal the drilled inner cavity to create a seamless and hygienic surface around the straw entry point and to further protect the straw opening. This resealing process not only protects the straw but also reinforces the structural integrity of the straw protector, ensuring that it remains durable and effective over time.

Finally, the fastener is attached to the device in step 113. The fastener may be a clamp, clip, clasp, or the like that allows the user to attach the device to a convenient location such as a purse, handbag, belt loop, key ring, or the like. The fastener allows the user quick and convenient access to the device in any situation such as in a public setting such as a restaurant, bar, or cafe where the risk of external contamination is high. This enhances the practicality and portability of the device, making it a convenient accessory for individuals who frequently dine out.

The resulting device is designed to cover a portion of a drinking straw, thereby protecting it from external contaminants prevalent in public settings. This method of protection is especially beneficial in maintaining hygiene and ensuring the safety of users who are concerned about direct exposure of their beverage straws to the environment.

It should be appreciated that the device of method 100 may incorporate various colors, shapes, sizes, styles, and/or insignias in accordance with the user's desire to express his or her unique and individual personality and style preferences and that the figures and description shown and described herein are for illustrative purposes only and are not intended to limit the scope of the present disclosure.

The particular embodiments disclosed herein are illustrative only, as the embodiments may be modified and practiced in different but equivalent manners apparent to those skilled in the art having the benefit of the present disclosure. It is therefore evident that the particular embodiments disclosed herein may be altered or modified, and any such variations are considered to fall within the scope of the present application. Accordingly, the protection sought herein is as set forth in the description and the appended claims and any other variations and modifications falling within the scope thereof.

What is claimed is:

1. A method of producing a device for protecting a beverage straw, the method comprising:
   providing an outer body mold configured to create an outer body of the device;
   mixing an epoxy resin configured to form the outer body;
   pouring the epoxy resin into the outer body mold;
   curing the epoxy resin to form the outer body;
   boring an inner cavity into a bottom portion of the outer body wherein the inner cavity is configured to receive a beverage straw;
   resealing the inner cavity with epoxy resin; and
   attaching a fastener to the outer body.

2. The method of claim 1, wherein the outer body mold is configured to create the outer body according to one or more preferences indicated by a user of the device.

3. The method of claim 2, further comprising the step of adding one or more substances to the epoxy resin according to the one or more preferences indicated by the user.

4. The method of claim 2, further comprising the step of adding one or more insignia to the outer body after the epoxy resin is fully cured according to the one or more preferences indicated by the user.

* * * * *